US012410637B2

(12) United States Patent
Fries

(10) Patent No.: US 12,410,637 B2
(45) Date of Patent: Sep. 9, 2025

(54) ANTI-THEFT DEVICE FOR CRADLE MOUNTED DEVICE WHICH REMOVABLY RECEIVES AN AUDIO/VIDEO DEVICE

(71) Applicant: Austin M. Fries, Waynesville, OH (US)

(72) Inventor: Austin M. Fries, Waynesville, OH (US)

( * ) Notice: Subject to any disclaimer, the term of this patent is extended or adjusted under 35 U.S.C. 154(b) by 0 days.

(21) Appl. No.: 18/342,801

(22) Filed: Jun. 28, 2023

(65) Prior Publication Data

US 2024/0318471 A1 Sep. 26, 2024

Related U.S. Application Data

(63) Continuation-in-part of application No. 17/722,349, filed on Apr. 17, 2022, now Pat. No. 12,104,412.

(51) Int. Cl.
*E05B 73/00* (2006.01)

(52) U.S. Cl.
CPC ........ *E05B 73/007* (2013.01); *E05B 73/0082* (2013.01)

(58) Field of Classification Search
CPC ........ E05B 17/14; E05B 17/142; E05B 17/18; E05B 17/186; E05B 67/36; E05B 67/383; E05B 73/0017; E05B 73/0023; E05B 73/007; E05B 73/0076; E05B 73/0082
See application file for complete search history.

(56) References Cited

U.S. PATENT DOCUMENTS

| | | | | |
|---|---|---|---|---|
| 7,243,514 B2 * | 7/2007 | Frantz | E05B 73/0082 | 411/910 |
| 8,711,553 B2 * | 4/2014 | Trinh | E05B 73/0082 | 361/679.02 |
| 9,022,337 B2 * | 5/2015 | Petruskavich | F16M 13/00 | 248/176.1 |
| 9,797,543 B2 * | 10/2017 | Lin | E05B 73/0082 | |
| 10,000,945 B2 * | 6/2018 | Frantz | E05B 73/0082 | |
| 11,401,738 B1 * | 8/2022 | Kelsch | E05B 73/0082 | |
| 11,553,790 B2 * | 1/2023 | Gulick | E05B 73/0082 | |
| 12,104,412 B2 * | 10/2024 | Fries | E05B 73/0082 | |
| 12,134,919 B2 * | 11/2024 | Gulick | E05B 73/0082 | |
| 2014/0124644 A1 * | 5/2014 | Wong | E05B 73/0082 | 248/553 |

* cited by examiner

*Primary Examiner* — Christopher J Boswell
(74) *Attorney, Agent, or Firm* — R. William Graham

(57) ABSTRACT

An anti-theft device includes a security bracket for a cradle mounted audio/video device having a cradle configured for quickly releasing the audio/video device by actuation of a release.

12 Claims, 4 Drawing Sheets

1000
1005
104
106
12
1011
100
102

10
1000
12
1009
1005
106
104
100

1000
100
102
12
33
1011

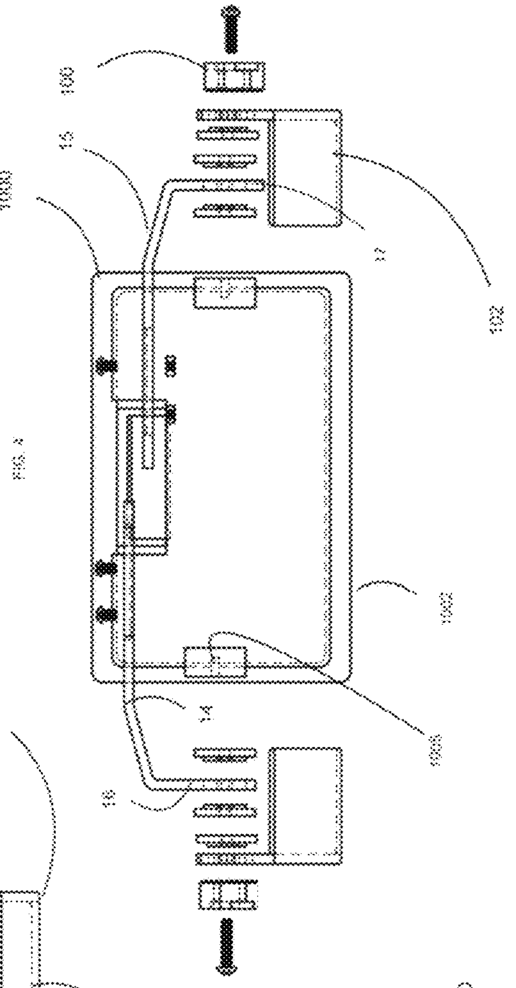
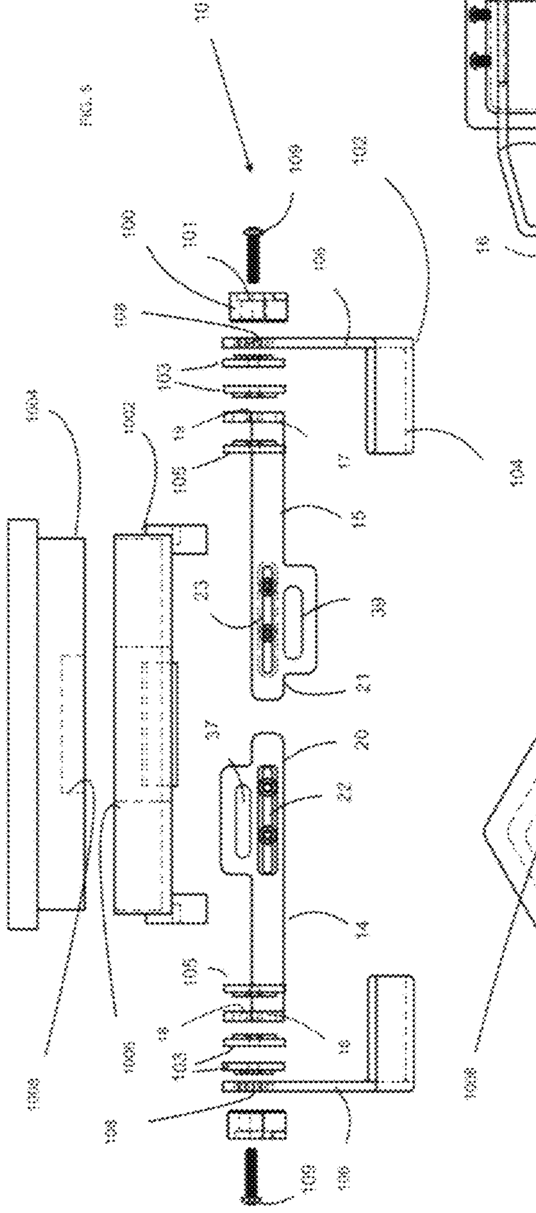
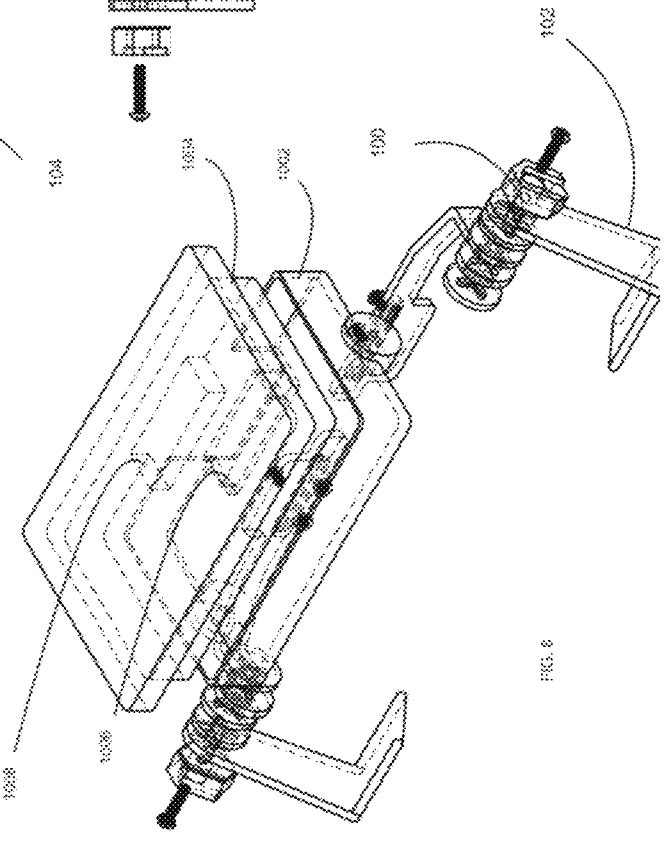

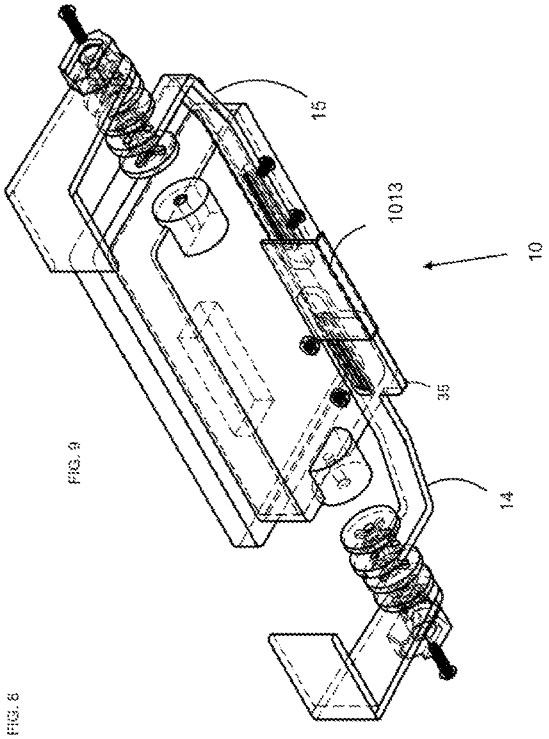
FIG. 9
FIG. 8
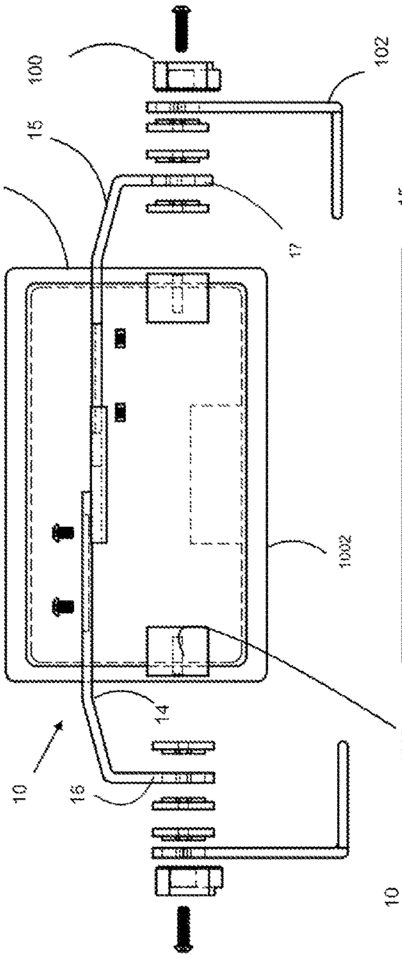
FIG. 10
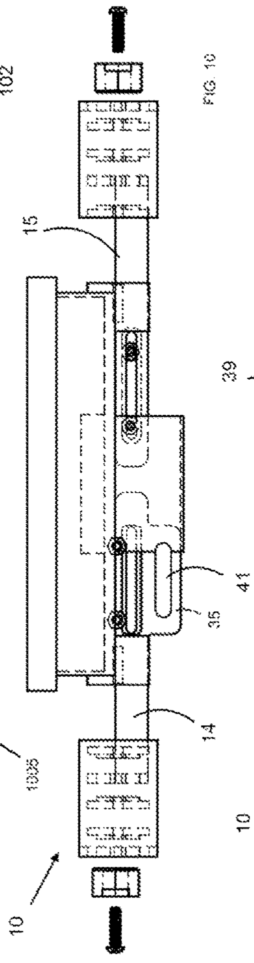
FIG. 11
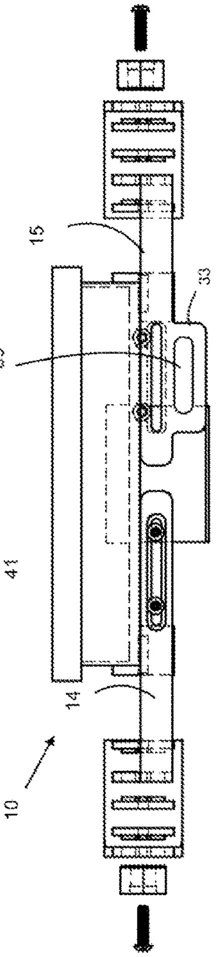

ANTI-THEFT DEVICE FOR CRADLE MOUNTED DEVICE WHICH REMOVABLY RECEIVES AN AUDIO/VIDEO DEVICE

This application claims the benefit of earlier filed U.S. application Ser. No. 17/722,349 field Apr. 17, 2022.

FIELD OF INVENTION

The invention is a device for preventing theft of audio/video devices, such as fish finders and navigation devices and, more specifically, an anti-theft device for cradle mounted device which removably receives an audio/video device, such as fish finders and navigation device.

BACKGROUND OF THE INVENTION

The theft of audio/video devices is a wide spread problem. Since most boats, particularly, fishing boats, are equipped with such devices it is becoming increasingly common for unauthorized persons to steal these audio/visual devices by simply disconnecting them from their mounting brackets when they are left unattended and unguarded for long periods of time. Additionally, some of the devices are designed for quick release through use of a docking cradle. Many fishing/boating enthusiasts want to be able to leave their devices, graph fish finder, connected to their boat but can't due to the risk of theft. These devices require addressing an additional risk in order to protect the device's components from being stolen.

Typically, the audio/visual devices are not provided with a locking mechanism which will prevent unauthorized removal. The prior art has provided some attempts at solving the removal of support brackets which mount the device to the vehicle (boat). This was discussed in commonly owned U.S. application Ser. No. 17/722,349 field Apr. 17, 2022. Issues were noted that the locking mechanism on the bracket had construction which was easily broken in order to remove the device from the boat. The instant applicant improved upon the prior art by providing an audio/video device mounted to a bracket which included a female housing portion having a recessed channel surface extending from a first side inwardly defined by an upwardly extending side surface and a laterally connecting surface through which a bolt receiving opening extends entirely through to an outer side of the female housing portion, the laterally connecting surface further included a first lock pin receiving surface extending at least partially into the female housing portion, and a male housing portion having a protruding surface of a complementary configuration to be slidably received against the recessed channel surface, and having an outwardly extending side surface a laterally connecting surface which respectively mate to the upwardly extending side surface and laterally connecting surface of the female housing portion when mated to one another, and a second lock pin receiving surface extending at least through the male housing portion and which is coaxially aligned with the first lock pin receiving surface when the female housing portion and male housing portion are mated. A push button cam lock was provided with a lock pin and an operably connected keyed portion which upon actuation enables movement of the lock pin from an extended position through the first and second lock pin receiving surfaces thereby preventing movement between the female and male housing portions when mated to a retracted position enabling movement between female and make housing portions.

While this was a significant improvement over the art, there is a need for additional security measures to meet the current state of the audio/video fish finder/navigational devices. Namely, there is a need to secure cradle mounted devices to prevent or deter theft of these devices. The instant invention addresses this issue.

SUMMARY OF THE INVENTION

It is an object to improve an anti-theft device to secure an audio/video device on a vehicle, e.g., watercraft, and/or other environments which employ a dock or cradle for quick removal of the device, such as cradle for a removably mounted fish finder or navigation device.

It is a further object to securely block a release mechanism on a cradle of an audio/video device to prevent the device from being released from the cradle.

Accordingly, the invention is directed to an anti-theft device for cradle mounted audio/video device having a cradle configured for quickly releasing the audio/video device by actuation of a release mechanism and having a support bracket for mounting the cradle which has a base for mounting to a support surface, e.g., boat surface, and have outwardly extending arms, wherein each outwardly extending arm has a co-alignable bolt receiving surface.

A secondary security bracket interconnects to the support bracket, wherein the secondary security bracket is mounted adjacent the outwardly extending arms of support bracket and is configured to extend adjacent the quick release mechanism to prevent actuation and in turn the detachment of the audio/visual device from the cradle. This further deters the theft of these devices.

In a preferred embodiment, the secondary security bracket includes a pair of blocking arms which have an outwardly disposed end having a bolt receiving surface therethrough for alignment with bolt receiving surfaces of outwardly extending arms of the support bracket. The blocking arms have an inwardly disposed end having a slotted surface for complementary alignment of the slots to receive position locking member, i.e., bolts therethrough, and can be locked in a desired position with respect to one another using lock nuts.

There is a lock external to each outwardly extending arms having a bolt receiving surface, and at least one washer disposed between one outwardly extending arm and adjacent outwardly disposed end and at least one washer disposed inwardly of the outwardly disposed end. Once the bolt is received through each of the arms and washers, a threaded neck of the bolt can thread to a threaded opening in a side of the cradle of the audio/video device. It is noted that the arms permit adjustable width and include a tab portion which can have a dual purpose of blocking the release mechanism as well as serve as a logo plate. The secondary bracket thus blocks actuation of the release mechanism. It is contemplated that the secondary bracket can be one piece, however, multiple arms provides for flexibility in adjustment to various sized devices as well as permits removal by disconnecting only one side to enable access to the release mechanism.

In another embodiment, the secondary bracket arm(s) can include one or more lateral protrusion or configuration to extend adjectives the quick release mechanism to either preclude either pulling or pushing on a given release mechanism configuration. Other objects and advantages will be apparent from reading the following description and viewing the drawings.

BRIEF DESCRIPTION OF THE DRAWINGS

FIG. 4. depicts a back exploded view of the device in FIG. 1 adjacent an audio/video device and associated mounting bracket.

FIG. 5. depicts a top exploded view of the of FIG. 4.

FIG. 6. depicts a perspective exploded view of the of FIG. 4.

FIG. 8 depicts a perspective exploded back view of another embodiment adjacent an exploded view of audio/video device components and associated mounting bracket.

FIG. 9 depicts a back exploded view of the device in FIG. 8.

FIG. 10 depicts a top of the device in FIG. 8.

FIG. 11 depicts a top view of another embodiment of the instant invention.

DETAILED DESCRIPTION OF THE INVENTION

Figures 1, 2:
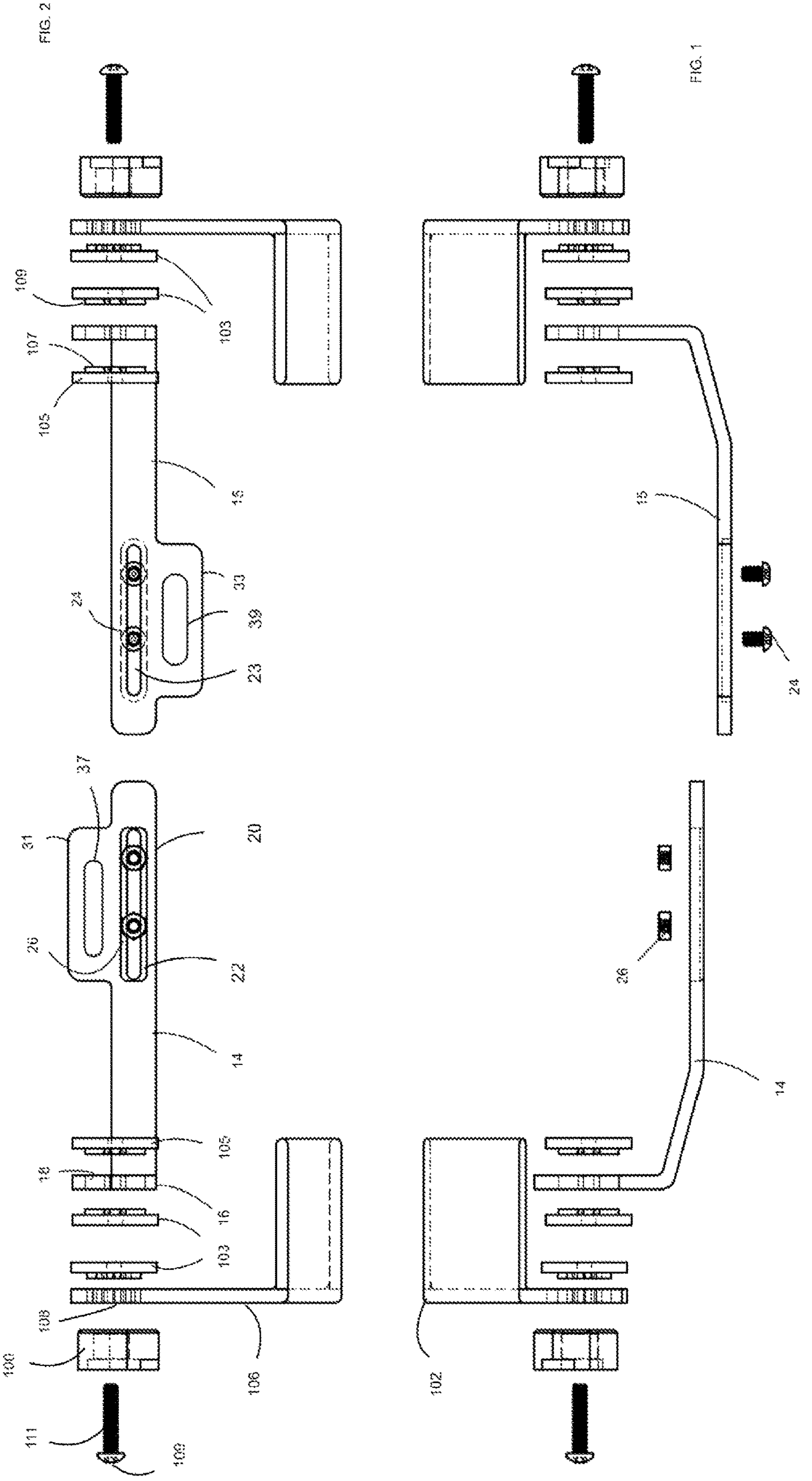
FIG. 1 depicts a bottom side perspective exploded view of components of the invention.
FIG. 2 depicts another side perspective exploded view of FIG. 1.
Figures 3A, 3B, 7:
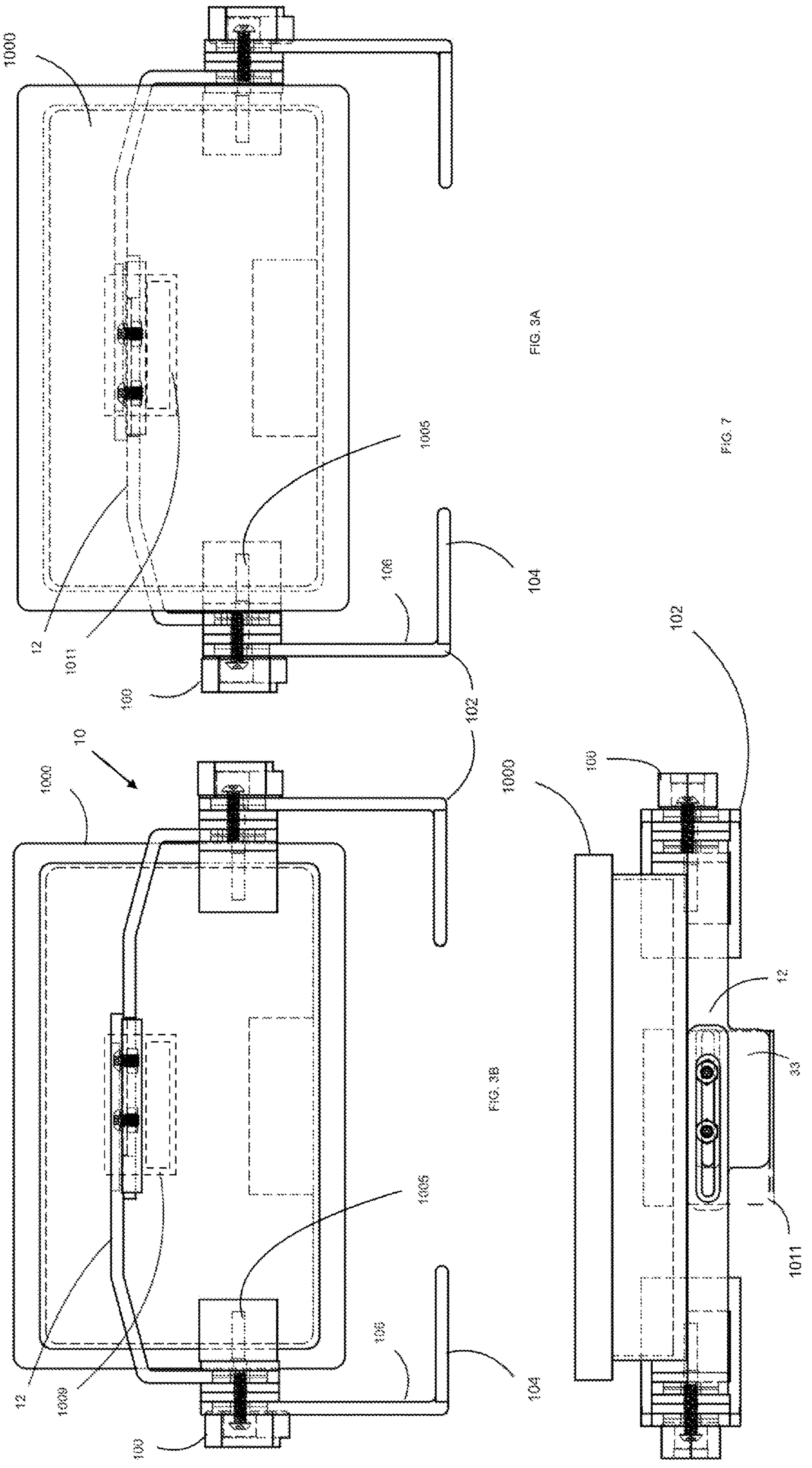
FIG. 3A depicts a back view of the device in FIG. 1 adjacent a type of cradle mounted audio/video device and associated mounting bracket.
FIG. 3B depicts a back view of another embodiment the device in FIG. 1 adjacent another type of cradle mounted audio/video device and associated mounting bracket.
FIG. 7 is a sop view of FIG. 3A.

The instant inventor recognized the deficiencies in security for audio/video equipment, particularly in the field of electronic audio/video graph fish finder equipment by providing a novel locking mechanism 100 which is the subject of commonly owned U.S. application Ser. No. 17/722,349 field Apr. 17, 2022 incorporated herein by reference. Referring to the drawings, like numbers refer to like parts.

While the improvement in the locking mechanism 100 is a great improvement, there remained a need to secure other types of such electronic devices as illustrated in the drawings by the numeral 1000, such as the Garmin® graphs. These devices 1000 employ multi-components, namely, a cradle 1002 and associated audio/video device 1004 (e.g., electronic graph). The cradle 1002 and audio/video device 1004 quick connect together by use complementary interfaces 1006 and 1008, respectively, to interconnect to one another.

Since many fishing/boating enthusiasts want to be able to leave their graph fish finder device 1000 connected to their boat but can't due to the risk of theft, the instant inventor enables this through this invention which provides an anti-theft device 10 for cradle 1002 to removably receives an audio/video device 1004. As illustrated in the drawings, the anti-theft device 10 allows such Garmin® product owners to finally be able to fully lock their units with minimal risk of theft.

The anti-theft device 10 can accommodate different size and configured modeled devices 1000 in order to lock down the same. For example, the anti-theft device 10 can be use to keep a release mechanism from being lifted/depressed in the case of a lift or depressed release mechanism 1009 or pushed/pulled in the case of a push/pull release mechanism 1011.

The anti-theft device 10 includes a secondary security bracket 12 used in conjunction with a support bracket 102 for an audio/video device 1000 and as stated which is of the type equipped with a cradle 1002 having release mechanism 1009, 1011, 1013 configured for quickly releasing the audio/video device 1000 by actuation of the release mechanism 1009, 1011, 1013. The primary support bracket(s) 102 have a base 104 for mounting to a support surface (e.g., boat surface) and have outwardly extending arm(s) 106, each arm 106 having a co-alignable bolt receiving surface 108.

The secondary security bracket 12 is mounted adjacent outwardly extending arms 106 of a support bracket 102 for device 1000 in and is configured to extend adjacent the quick release mechanism 1008/1010 to prevent actuation and in turn the detachment of the audio/visual device 1000. In a preferred embodiment, the secondary security bracket 12 includes a pair of blocking arms 14, 15 which have an outwardly disposed end 16, 17 having a bolt receiving surface 18, 19 therethrough for alignment with bolt receiving surfaces 108 of outwardly extending arms 106 of the support bracket 102. The blocking arms 14, 15 have an inwardly disposed end 20, 21 having a slotted surface 22, 23 for complementary alignment of the slots 22, 23 to receive position locking bolts 24, i.e., bolts therethrough, which can be locked in a desired position with respect to one another using lock nuts 26. These can be made of stainless steel 5 Lobe tamper resistant hardware which requires special tool bit to loosen.

There is a lock 100 external to each outwardly extending arms 106 having a bolt receiving surface 101, and washers 103 disposed between one outwardly extending 106 arm and outwardly disposed ends 16, 17 and washers 105 disposed inwardly of the outwardly disposed ends 16, 17. A bolt 109 is received through the lock 100, arms 106, ends 16, 17 and washers 103, 105, a threaded neck 111 of the bolt 109 can thread to a threaded opening 1005 in a side of the cradle 1002 of audio/video device 1000. It is noted that the arms 14, 15 permit adjustable width. As seen in the various embodiments, the arms 14 and 15 can include various configurations of a laterally extending tab portion 31, 33, 35, respectively, which can have a dual purpose of blocking the release mechanisms 1009, 1011, 1013 as well as serve as a logo plate area 37, 39, 41. The secondary bracket 12 thus blocks actuation of the release mechanisms 1008, 1010 of various types. It is contemplated that the secondary bracket 12 can be one piece, however, multiple arms 14, 15 provide for flexibility in adjustment to various sized devices as well as permits removal by disconnecting only one side to enable access to the release mechanism 1008, 1010.

The secondary security bracket 12 can be machined from ¼" thick, 3003 aluminum. This aluminum can bent to fit the contour of the audio/video device 1000. Washers 103, 105 can include stamped metal or thermoplastic with a grooved or splined surface 107, 109 to provide an angle adjustment component to allow user to match the secondary security bracket 12 in appropriate location to a users desired angle of audio/video device 1000 (graph) position. This is done by plastic adjustment pieces (washers 103, 105) being mated together in a male female style (splined) mating. Lock arm (E) is two pieces of aluminum bent in different locations to allow lock arms to rest on top of each other. Each arm 14, 15 provides slot 22, 23, respectively, to bolt both together with tamper proof hardware (bolts 24 and nuts 26) to prevent the action of arms 14, 15 being pried apart.

While the present invention has been described in terms of a preferred embodiment, it is apparent that other forms could be adopted by one skilled in the art. In other words, the teachings of the present invention encompass any reasonable substitution or equivalents of the claim limitations. Accordingly, the scope of the present invention is to be limited only by the following claims.

What is claimed:

1. An anti-theft device for a cradle mounted audio/video device having a cradle configured for quickly releasing the audio/video device by actuation of one of a push and pull release mechanism, which includes:

a support bracket for mounting the cradle which has a base for mounting to a support surface on one of a vehicle and watercraft and having integrally connected outwardly extending arms to receive the cradle, wherein each outwardly extending arm has a co-alignable bolt receiving surface; and a secondary security bracket interconnected to the support bracket, wherein said secondary security bracket includes at least one blocking arm having an outwardly extending end having a bolt receiving surface and which is mounted adjacent at least one of the outwardly extending arms of the support bracket to receive a bolt through said bolt receiving surface of said outwardly extending arm of said support bracket and said outwardly extending end of said secondary support bracket, and said at least one blocking arm includes an inwardly extending end configured to extend adjacent said one of a push and pull release mechanism to block actuation thereof and in turn the detachment of the audio/visual device from the cradle.

2. The anti-theft device of claim 1, wherein said secondary security bracket includes a pair of said blocking arms which are L-shaped and each have said outwardly disposed end and said inwardly disposed end which has a slotted surface for complementary alignment to receive a position locking member therethrough enabling locking said blocking arms in a desired position with respect to one another.

3. The anti-theft device of claim 2, which further includes a lock external to each of the outwardly extending arms having a bolt receiving surface, and at least one washer disposed between each said outwardly extending arm of said bracket and said outwardly disposed end of each said blocking arm and at least one washer disposed inwardly of said outwardly disposed end of each said blocking arm.

4. The anti-theft device of claim 2, wherein said blocking arms permit adjustable width by virtue of said slotted surfaces being oblong and said locking member including at least one bolt and nut.

5. The anti-theft device of claim 2, wherein said blocking arms include a tab portion on said inwardly disposed end of said blocking arm configured to block the release mechanism.

6. The anti-theft device of claim 5, wherein said tab portion includes a logo surface.

7. An anti-theft device for a cradle mounted audio/video device, which includes:

a cradle configured for quickly releasing the audio/video device by actuation of one of a push and pull release mechanism;

a support bracket for mounting said cradle which has a base for mounting to a support surface on one of a vehicle and watercraft and have having integrally connected outwardly extending arms to receive said cradle, wherein each outwardly extending arm has a co-alignable bolt receiving surface; and a secondary security bracket interconnected to the support bracket, wherein said secondary security bracket includes at least one blocking arm having an outwardly extending end having a bolt receiving surface and which is mounted adjacent at least one of the outwardly extending arms of the support bracket to receive a bolt through said bolt receiving surface of said outwardly extending arm of one said support bracket and said outwardly extending end of said secondary support bracket, and said at least one blocking arm includes an inwardly extending end configured to extend adjacent said one of a push and pull quick release mechanism to block actuation thereof and in turn the detachment of the audio/visual device from the cradle.

8. The anti-theft device of claim 7, wherein said secondary security bracket includes a pair of said blocking arms which are L-shaped and each have said outwardly disposed end and said inwardly disposed end having a slotted surface for complementary alignment of the slots to receive position locking member therethrough enabling locking said blocking arms in a desired position with respect to one another.

9. The anti-theft device of claim 8, wherein said blocking arms permit adjustable width by virtue of said slotted surfaces being oblong and said locking member including at least one bolt and nut.

10. The anti-theft device of claim 8, wherein said blocking arms include a tab portion on said inwardly disposed end of said blocking arm configured to block the release mechanism.

11. The anti-theft device of claim 10, wherein said tab portion includes a logo surface.

12. The anti-theft device of claim 7, which further includes a lock external to each of said outwardly extending arms having a bolt receiving surface, and at least one washer disposed between one outwardly extending arm of said bracket and said outwardly disposed end of said blocking arm and at least one washer disposed inwardly of said outwardly disposed end of said blocking arm.

* * * * *